United States Patent
Ryan et al.

(10) Patent No.: US 8,845,007 B2
(45) Date of Patent: Sep. 30, 2014

(54) DRAG REDUCING DEVICE

(75) Inventors: Reeder Ryan, Carmel, IN (US); John Vogel, Columbus, IN (US); James R. Tuerk, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 24 days.

(21) Appl. No.: 13/447,481

(22) Filed: Apr. 16, 2012

(65) Prior Publication Data

US 2013/0076063 A1    Mar. 28, 2013

Related U.S. Application Data

(60) Provisional application No. 61/538,391, filed on Sep. 23, 2011.

(51) Int. Cl.
*B62D 35/00* (2006.01)

(52) U.S. Cl.
CPC .................................. *B62D 35/001* (2013.01)
USPC ...................................................... 296/180.1

(58) Field of Classification Search
USPC .......... 296/180.1, 180.4, 180.2, 180.5, 180.3, 296/181.5; 180/903; 105/13
See application file for complete search history.

(56) References Cited

U.S. PATENT DOCUMENTS

| | | | |
|---|---|---|---|
| 3,010,754 A | 11/1961 | Shumaker | |
| 3,072,431 A | 1/1963 | Shumaker | |
| 4,214,787 A | 7/1980 | Chain | |
| 4,486,919 A | 12/1984 | Schoenke | |
| 5,280,990 A | 1/1994 | Rinard | |
| 6,854,788 B1* | 2/2005 | Graham | 296/180.4 |
| 7,240,958 B2* | 7/2007 | Skopic | 296/180.1 |
| 7,625,034 B1* | 12/2009 | Fitzgerald | 296/180.1 |
| 2011/0095566 A1* | 4/2011 | Chen | 296/180.4 |
| 2011/0148140 A1* | 6/2011 | Benton | 296/180.1 |

* cited by examiner

*Primary Examiner* — Joseph D Pape
*Assistant Examiner* — Dana Ivey
(74) *Attorney, Agent, or Firm* — Maginot, Moore & Beck, LLP

(57) ABSTRACT

A drag reducing device includes an air flow turning component having a curved surface adapted to turn air flow passing over the curved surface, a first mounting component for connecting the air flow turning component to a rear door of the vehicle, and a second mounting component for connecting the air flow turning component to one of the opposite side walls of the vehicle. The mounting components are configured so that the air flow component is automatically in a deployed position when the rear door is closed, so the air flow turning component turns air flow passing along the side the vehicle inward to thereby reduce drag. The mounting components are further configured so that the air flow component is automatically stowed between the rear door and the vehicle side wall when the door is fully opened. The air turning component is sized for a minimal prominence when stowed.

28 Claims, 17 Drawing Sheets

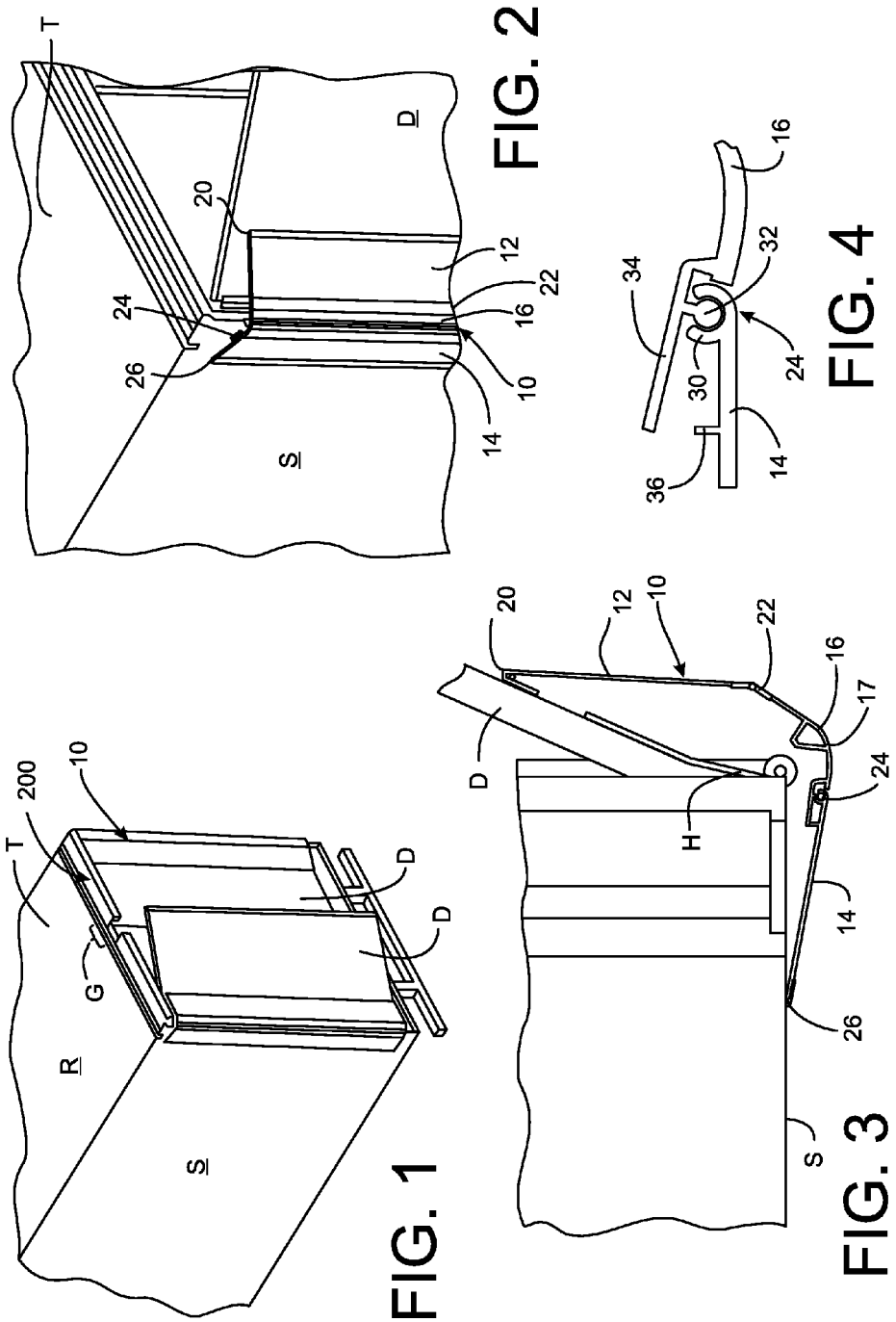

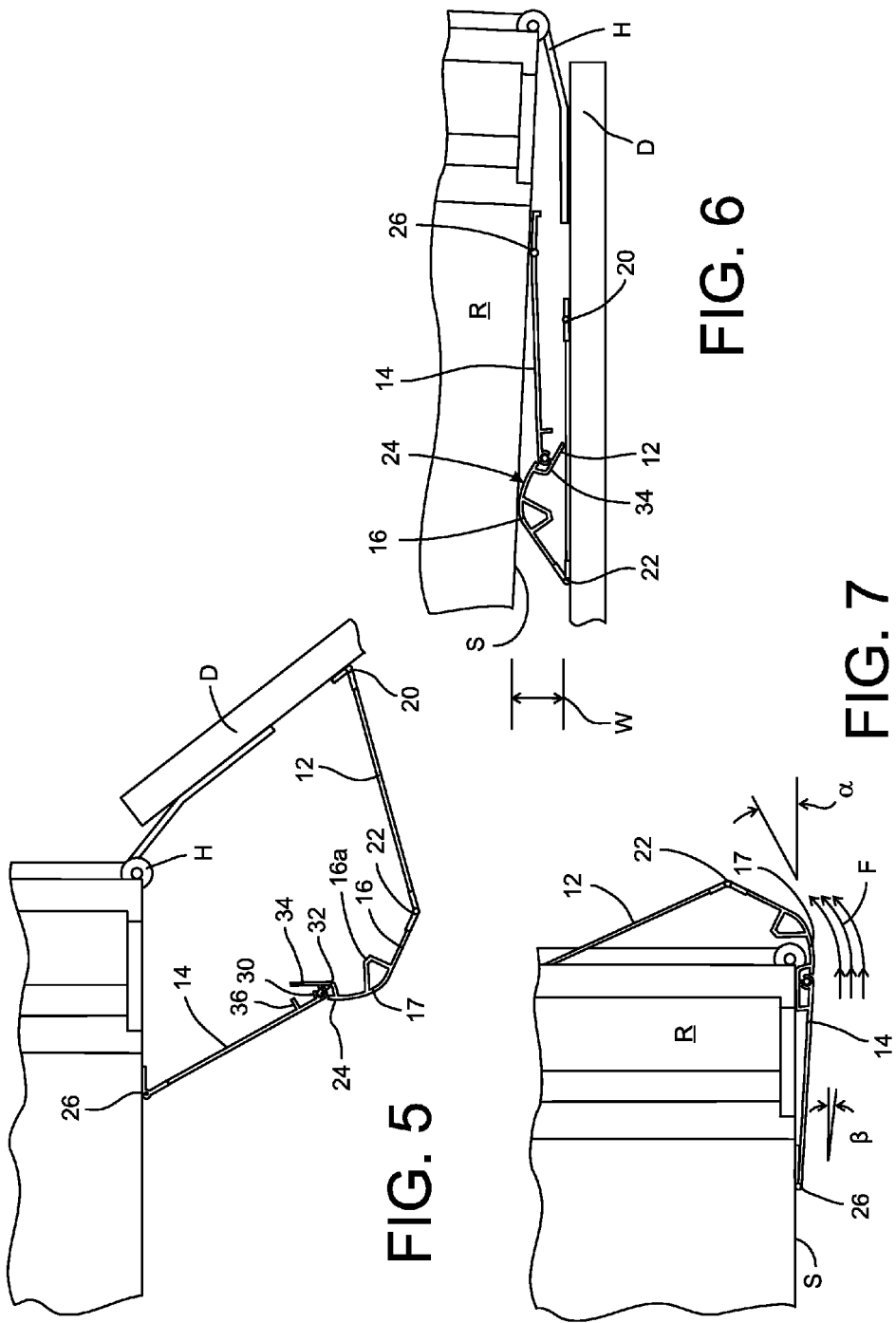

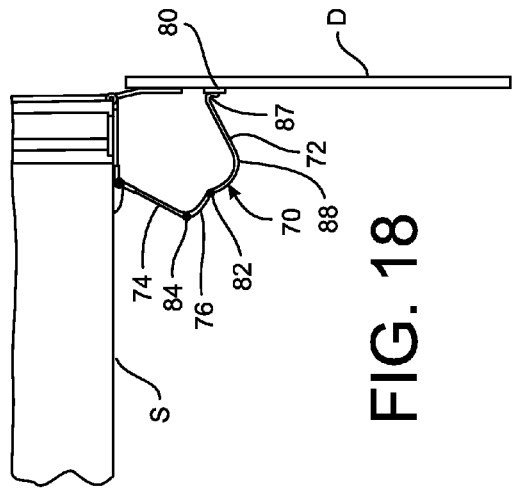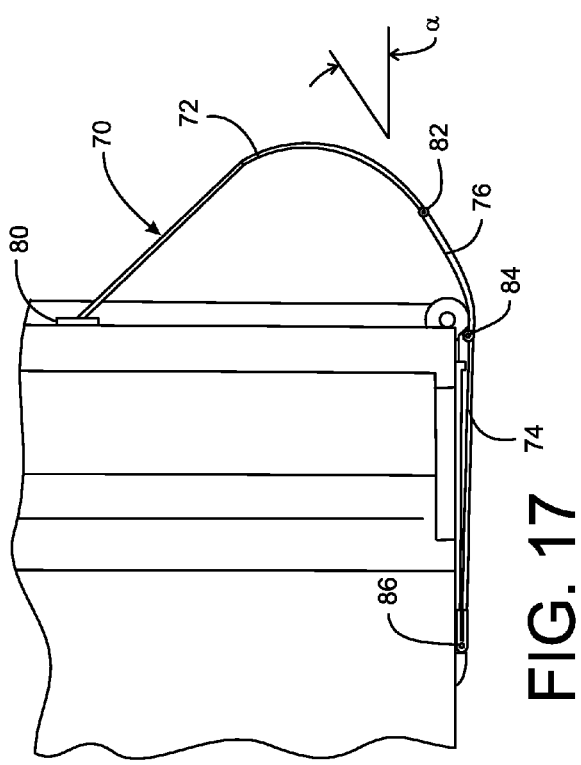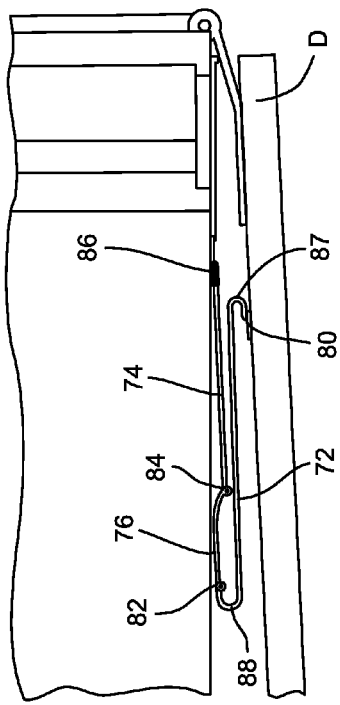

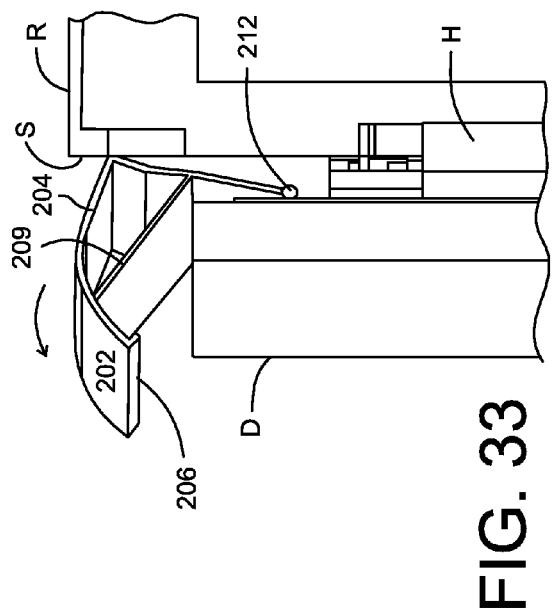
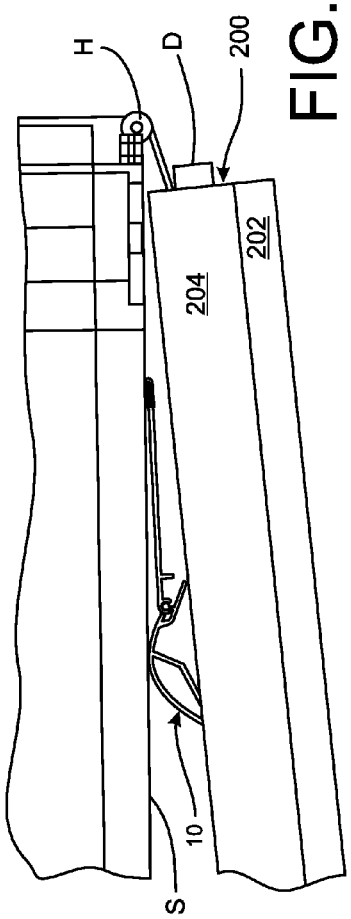
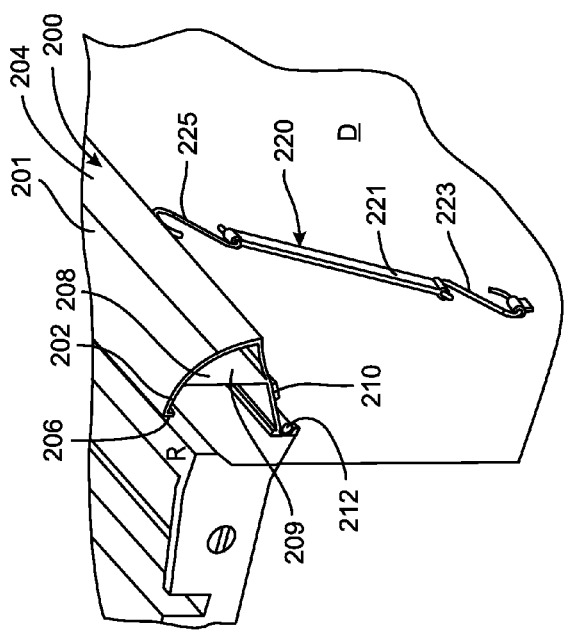

DRAG REDUCING DEVICE

REFERENCE TO RELATED APPLICATION

The application claims priority to and is a utility conversion of provisional application Ser. No. 61/538,391, filed on Sep. 23, 2011, the entire disclosure of which is incorporated herein by reference.

BACKGROUND

The present disclosure relates to drag reduction devices for land vehicles, such as trucks, tractor-trailer rigs, vans, buses, recreational vehicles and similar vehicles having a large frontal area.

Fuel economy is a persistent concern for all land vehicles and is particularly acute for large vehicles such as trucks and tractor-trailer rigs. Fuel economy improvements have been achieved by innovation in engine design and improvements in fuel composition. However, the size and shape of the vehicles plays a substantial role in fuel economy. Ultimately, drag is the greatest enemy to fuel economy, with as much as 70% of the engine power devoted to cutting through the air in front of the vehicle.

Drag is a force that resists the movement of a body through a fluid, whether the body is a baseball and the fluid is air, or the body is a swimmer moving through water. Drag is a function of two components—friction drag and pressure drag. Friction drag is a force that acts tangential to a surface of the body. Friction drag is increased by irregularities or roughness on the surface and decreased by making the surface more slippery. A clean truck cuts through the air more efficiently and with less friction drag than a dirty truck.

Pressure drag is a force that acts perpendicular to a surface and is a function of the surface area in the direction of travel as well as the velocity or speed at which the body is traveling. Pressure drag increases as the square of velocity so that doubling vehicle speed actually creates four times more pressure drag. On the other hand, pressure drag is directly related to surface area so that a ten percent reduction in surface area leads to a ten percent decrease in pressure drag.

For aerodynamically configured vehicles, such as airplanes, friction drag contributes more heavily to overall drag than pressure drag. However, for land vehicles this relationship is reversed significantly. For a typical tractor-trailer, pressure drag can be as much as ten times greater than friction drag due to the large frontal surface area of the truck. Unfortunately, the size of these types of vehicles is dictated by their function—hauling products or materials. Unlike passenger vehicles, the box-like shape of trucks cannot be significantly altered. A smaller frontal surface area means a smaller truck, which means less cargo that can be hauled. Pressure drag in land vehicles, and especially in trucks, is increased by pressure "hot spots", such beneath the undercarriage, behind the rear of the trailer or between the tractor and the trailer. These hot spots are generally regions of low pressure, which causes air flowing over the vehicle to deviate from a streamlined path around the vehicle. Vortices can form in these hot spots that significantly increase the pressure drag.

In quantitative terms, if a square body has a drag coefficient ($C_D$) of 1.00, elongating the body into a rectangular shape reduces $C_D$ to 0.80. Adding a rounded nose cuts the coefficient in half to 0.40. Adding a "boat tail" or a conical tail decreases $C_D$ further to 0.20. The typical boattail configuration includes plates projecting from the rear of the vehicle and angled inwardly at an angle of 10-15°. An elliptical body tapered at both ends produces a drag coefficient less than 0.05, but the shape significantly reduces available cargo space and is difficult to produce.

It has been estimated that a 20% reduction in drag yields at least a 10% increase in fuel economy at highway speeds. For truckers and trucking companies, this increase in fuel economy means significantly reduced fuel costs year in and year out. For the environment, increases in fuel economy mean fewer deleterious emissions. A significant amount of effort has been expended in developing drag reduction technology for trucks. These efforts include streamlining the tractor, introducing seals, air deflectors or vortex generators in the gap between the tractor and trailer, and adding undercarriage skirts, guide vanes, air deflectors and boat tails to the trailer. Each of these modifications contributes in some measure to the overall drag reduction, so a fully optimized rig will incorporate a number of these improvements.

Presently, the typical drag reduction device utilizes "mechanical" redirection of the air flow to reduce drag. For instance, one type of device utilizes spoilers or fairings mounted to the top trailing edge of a vehicle or trailer to redirect the airflow and attempt to reduce turbulence. Another drag reduction device is the boat tail device that includes boat tail plates extending rearward from the rear of the trailer. Boat tail devices can reduce drag by up to ten percent. The typical boat tail is a large shell that is mounted over the rear doors of the trailer. Such devices are cumbersome to install and remove. Moreover, the large unitary shell is difficult to store when access to the rear doors is desired, such as to unload the trailer.

Other "mechanical" drag reduction devices require intervention by the vehicle operator to deploy and stow the device, while still other mechanical approaches require the vehicle operator to manipulate the drag reduction device to access the rear doors of the vehicle or trailer. Some mechanical devices are mounted directly to the vehicle/trailer doors which can eliminate the need to manipulate the device in order to access the trailer door. However, these devices are bulky and prevent the trailer/vehicle door from being fully opened flat against the side wall of the trailer/vehicle. This discrepancy can pose significant risks at shipping/receiving locations where trucks are backed in to closely spaced loading docks. A door that projects too far away from the side of the trailer can be struck by an adjacent vehicle as it attempts to back into an adjacent loading dock.

A more recent development in drag reduction are non-mechanical devices, meaning devices that do not mechanically turn or redirect the air flow, like a spoiler, but instead generate a force that acts on the air flow. One such device is a plasma flow actuator that provides a "body force" to the air flow as it passes over a surface to accelerate the air, thereby stabilizing the boundary layer and causing the air to remain "attached" or conform to the surface to reduce or eliminate flow separation, turbulence and, ultimately, drag. One type of plasma flow actuator is electronically controlled for activation at appropriate vehicle speeds and for precise operation to optimize the drag reducing effect.

Whether the actuator is mechanical or non-mechanical, there is a persistent need for a drag reduction device that does not impede the ability to open the rear doors of a trailer or truck on which the device is mounted. Moreover, in order to ensure that the drag reduction device is consistently used, the device should be "automatic", meaning that it does not require any intervention by the vehicle operator to deploy or to position the device clear of the vehicle/trailer doors when access is desired for loading or unloading the vehicle. There is also a need for a drag reduction device that has a lower profile than existing devices—i.e., that does not extend excessively beyond the end of the vehicle—to lessen the chance for damaging contact when the vehicle is moved in reverse.

DESCRIPTION OF THE FIGURES

FIG. 1 is a perspective view of the rear of a vehicle or trailer with a drag reduction device mounted thereon.

FIG. 2 is a perspective view of the device shown in FIG. 1, depicted with the rear door of the vehicle or trailer partially opened.

FIG. 3 is a top view of the device shown in FIG. 2 with rear door partially open.

FIG. 4 is a top view of a hinge component of the device depicted in FIG. 3.

FIG. 5 is a top view of the drag reduction device depicted in FIG. 3, shown with the rear door opened further.

FIG. 6 is a top view of the drag reduction device depicted in FIG. 3, shown with the rear door fully open and the drag reducing device in its fully stowed position.

FIG. 7 is a top view of the drag reduction device depicted in FIG. 6, shown with the rear door fully closed and the drag reducing device in its deployed position.

FIG. 17 is a top view of a drag reduction device according to yet another embodiment with the device in its deployed position.

FIG. 18 is a top view of the drag reduction device shown in FIG. 17, with the rear door partially opened.

FIG. 19 is a top view of the device shown in FIG. 17, with the device in its stowed position.

FIG. 32 is a rear perspective view of a top drag reducing device shown in its deployed position.

FIG. 33 is rear view of the top drag reducing device of FIG. 32 shown in its stowed position.

FIG. 34 is a top view of the top drag reducing device of FIG. 33 as well as a side drag reducing device, both in their stowed positions.

DETAILED DESCRIPTION

Figure 9:
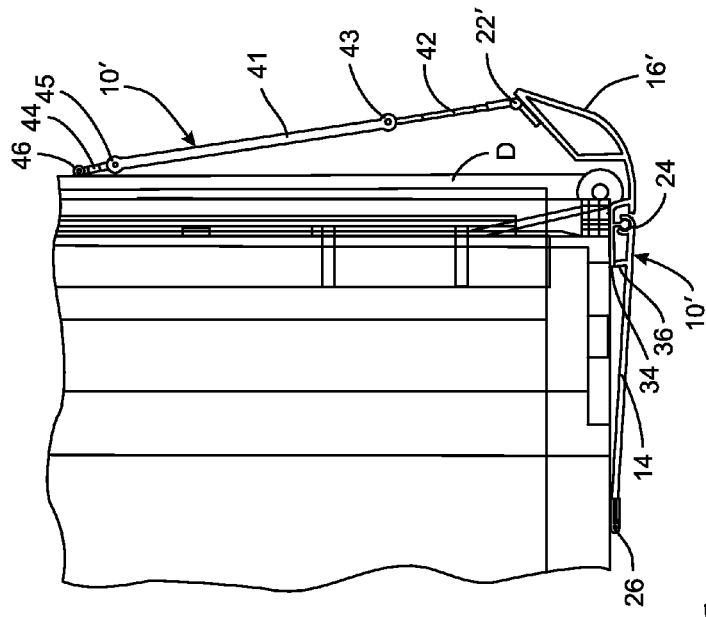
FIG. 9 is top view of a drag reduction device shown in FIG. 8 with the device in its deployed position.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

According to one embodiment, a drag reducing device 10 is mounted to the rear of a trailer T, as depicted in FIGS. 1-7. In particular, the device 10 is mounted between the side wall S of the trailer and a rear door D. The rear door D can be of a typical configuration to rotate outward about a hinge H, as shown in FIG. 3. As also shown in those figures, the drag reducing device remains attached to the side wall S and rear door D as the door is pivoted from its closed position, depicted in FIG. 7, to its open position, illustrated in FIG. 6. The device 10 includes a pair of mounting components for attaching the device to the vehicle, including a rear plate 12 and a side plate 14 connected by an air turning component 16. Each of the plates 12, 14 and air turning component 16 are elongated to be at least nearly co-extensive with the height of the rear door D, as best seen in FIG. 1. Optimally, the device 10 extends along the entire height of the trailer body T.

The rear plate 12 mounting component is attached to the rear door D by a hinge 20. Likewise, the side plate 14 mounting component is attached to the side wall S of the trailer T by a hinge 26. In one embodiment, the hinges 20, 26 may extend along the entire length of the plates, such as a piano hinge. However, other hinge arrangements are contemplated that permit a suitable range of rotation, such as a series of hinges, a keder or other suitable hinge configurations. For instance, as seen by comparing FIGS. 6 and 7, the hinge 26 attached to the trailer side wall S is configured so that the side plate 14 can pivot almost 180° between the actuated or deployed position of the device (FIG. 6) and the stowed position (FIG. 7). Similarly, the hinge 20 connecting the rear plate 12 to the door D pivots through about 120° from the deployed position to the stowed position.

The air turning component 16 is connected to the two plates by respective hinges 22, 24. The angular range of relative movement at the hinges 22, 24 is not as great as for the hinges 20, 26. In one embodiment, the hinge 22 between the rear plate 12 and the air turning component 16 is a piano hinge. The hinge 24 between the air turning component and the side plate 14 may have a different configuration, as shown in detail in FIGS. 4-5. In this embodiment, the hinge 24 is an interlocking pivoting arrangement that includes an elongated channel 30 defined on the side plate 14 and a mating elongated bead 32 defined on the air turning component 16. The bead 32 is configured to slide into the channel 30 in a close running fit. The air turning component includes a flange 34 that projects toward the side plate 14 and contacts a rib 36 on the side plate to limit the relative rotation of the air turning component 16 toward the side plate 14. In particular, as shown in FIG. 7, the flange 34 contacts the rib 36 when the device 10 is deployed. As the device moves to its stowed position remains in contact for part of the movement, as shown in FIG. 3, but then moves out of contact with the rib is the door is pivoted further, as reflected in FIGS. 5 and 6. The flange 34 may contact the rear door D when the device is fully stowed (i.e., the door is fully open), as shown in FIG. 6. The hinges 22, 24 are configured to allow the device 10 to fold to as small a width as possible, limited only by the width of the air turning component 16. In a preferred embodiment, the air turning component 16 is configured to a width W (FIG. 6) of 2-4 inches, which allows the rear door D to be fully opened in accordance with typical usage of the trailer T.

As shown in FIG. 7, the air turning component 16 defines a smooth arcuate surface 17 from the side wall S of the trailer to the rear of the trailer. The component is configured to "turn" the air flow F through an angle α that reduces the turbulence and prevents flow separation at the rear of the trailer. It has been found that "turning" the air flow F in this manner reduces the pressure drag as the vehicle moves through the air. In one embodiment, the air turning component 16 is configured to produce an angle α of greater than 10°. In certain embodiments the component 16 is configured to produce an angle α of about 30°, which is believed to provide an optimum drag reducing effect. The outer surface 17 of the component 16 is thus configured at a radius, which in certain embodiments may be greater than 2.0 in. and less than 6.0 in. In one specific embodiment the outer surface is defined at a radius of about 4.0 in. to provide a balance between the air flow turning angle and the profile or prominence of the device.

It is further contemplated that the side plate 14 may be arranged at an angle β relative to the side S of the truck/trailer. This angle merges into the air turning component to provide for a smooth transition of the airflow from along the side of the vehicle to the turning component 16. The angled side plate also allows the device to fit around trailer appurtenances, such as the door hinges. It is believed that this transition helps collimate the air flow which in turn reduces the risk of flow separation or turbulence at the air turning component. In one embodiment the angle β is no greater than about 5°. It can be appreciated that the flange 34 may be arranged to abut the side wall S when the device 10 is in its active deployed position. The overall width of the hinge 24, or more specifically the height of the rib 36, may thus be adjusted to determine the angle β.

The air turning component 16 may be formed as an extrusion of a durable material, such as aluminum or stainless steel, or extruded or molded from a durable plastic, such as ABS plastic. The extrusion may incorporate a generally hollow interior frame 16a (FIG. 5) inside the inner surface of the component that helps the component resist crushing in the stowed position or resist impacts when in the deployed position. The frame 16a may also be configured to house other components to assist in the drag reducing function of the device 10. For instance, if the device incorporates certain active device components, such as plasma actuators and vehicle lights, the components may be housed within the interior frame 16a.

It can be appreciated from the sequence depicted in FIGS. 1-7 that the device 10 can be deployed and stowed without any intervention by the vehicle operator. The device 10 moves with the rear door D so that when the door is closed, as shown in FIG. 7, the device is automatically situated in its deployed or actuated position. When the door is opened, as shown in FIG. 6, the device 10 automatically moves to its stowed position. The air turning component 16 is the primary functional component of the device since it is the curvature of the surface 17 that turns the airflow at the rear of the vehicle. The device 10 is configured so that the air turning component 16 is supported by the plates 12, 14 in all positions of the device. The air turning component 16 is large enough to present a sufficient surface to effectively turn the air flow, but is small enough in width W so that the device 10 does not interfere with the normal opening of the rear doors D of the trailer.

It can be appreciated that the side plate 14 of the device provides a smooth, seamless transition from the side wall S of the trailer to the air turning component 16. The hinge arrangement 24 between the side wall and the air turning component allows for an uninterrupted surface from the surface of the side plate to the outer surface 17 of the air turning component. The hinges 20, 22, 24 and 26 can be configured so that when the device 10 is deployed (FIG. 7) the hinge 24 is tightly closed so that only a negligible seam exists at the interface between the side plate and air turning component.

Figure 8:
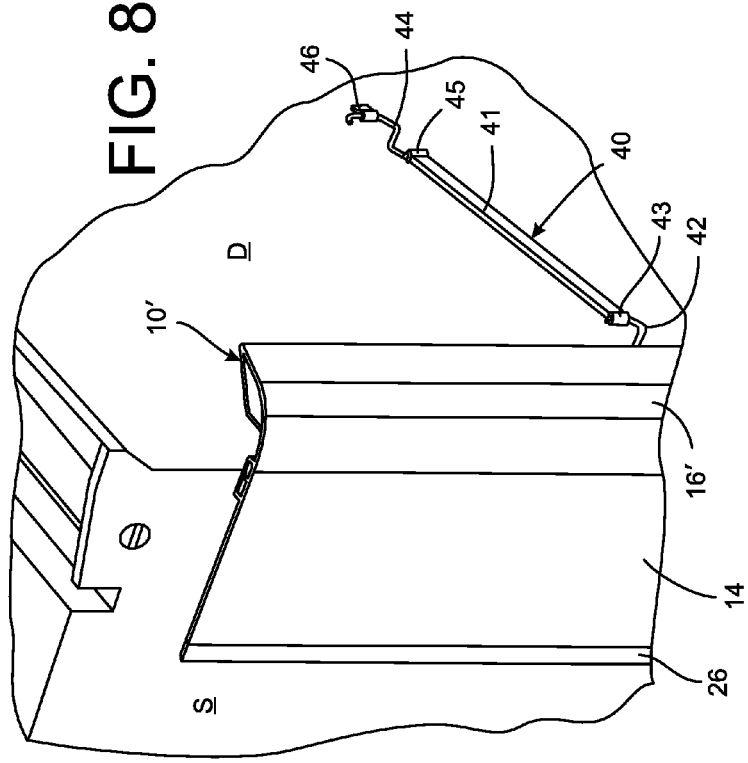
FIG. 8 is a rear perspective view of a drag reduction device according to a further embodiment, shown with the device in its deployed position.
Figure 10:
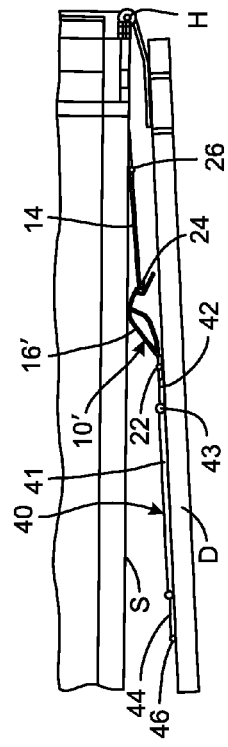
FIG. 10 is top view of a drag reduction device shown in FIG. 8 with the device in its stowed position.

In an alternative embodiment, the plate 12 may be replaced with a retraction element, such as the retraction element 40 of the drag reducing device 10' illustrated in FIGS. 8-10. The device 10' includes a side plate 14 mounted to the side S of the truck or trailer by a hinge 26. The side plate 14 it connected to the air turning component 16' by a hinge 24. The hinges 24, 26 and side plate 14 of the device 10' in FIG. 8 may be constructed as like components of the device 10 in FIG. 3. Unlike the device of FIG. 3, the device 10' uses a number of retraction elements 40 as a mounting component in lieu of the rear plate 12. Each retraction element 40 is configured to exert an elastic force on the air turning component 16' to hold the component in its deployed position, as shown in FIGS. 8-9. In one embodiment, each retraction element includes a resilient elastic band or strap 41 connected at one end to a rear door D and at an opposite end to the air turning component 16'. The ends of the elastic strap 41 may include fittings 43, 45 adapted to engage hooks 42, 44. The hook 42 are further connected to a fitting 22' on the air turning component 16', while the hook 44 is connected to a fitting 46 mounted to the rear door D. It is contemplated that multiple retraction elements 40 are engaged between the device 10' and the rear door at spaced apart positions. Preferably, at least three such retraction elements are used.

The retraction elements 40 act in a manner similar to the rear plate 12 of the previous embodiment. When the device 10' is in its deployed position, as shown in FIG. 9, the retraction elements apply a force to pull the air turning component 16' toward the rear door. The elastic force of the band 41 is resisted by the contact between flange 34 and rib 36 which prevents further rotation of the air turning component 16' toward the door. When the door D is opened to the position shown in FIG. 10, the retraction elements 40 keep the air turning component 16' tight against the rear door.

The retraction elements 40 may be connected to the rear door D and air turning component 16' using other types of connectors. The retraction elements may utilize other resilient and/or elastic elements, such as springs; however, the elastic bands 41 provide a unitary structure that is better able to withstand road vibration and dirt. The elastic bands are also easily replaced by simply removing the hooks 42, 44 from the corresponding fittings 43, 45.

Figure 12:
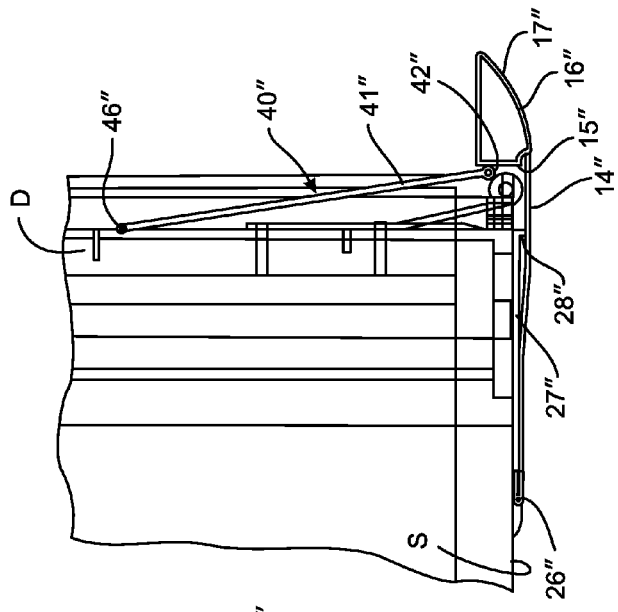
FIG. 12 is a top view of the drag reduction device shown in FIG. 11.
Figure 11:
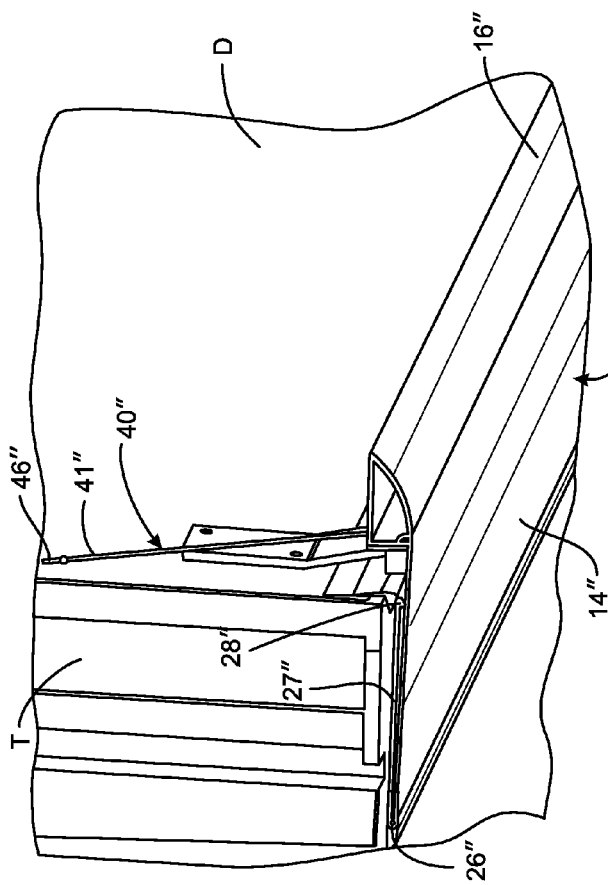
FIG. 11 is a top perspective view of a drag reduction device according to a further embodiment in its deployed position.
Figure 13:
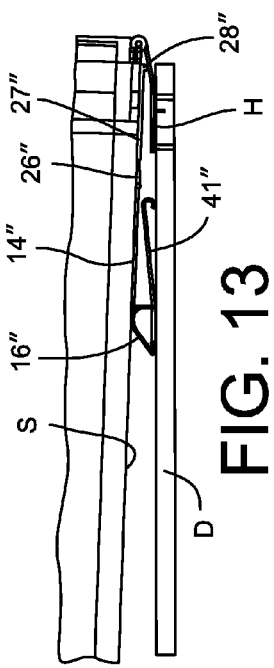
FIG. 13 is a top view of the drag reduction device depicted in FIG. 11, shown with the device in its stowed position.

In an alternative embodiment shown in FIGS. 11-13, a drag reducing device 10" includes an air turning component 16" in the form of an elongated extrusion in which the outer surface 17" follows the curvature described above to turn the air flow. The extruded turning component 16" is attached to a side plate 14", and more particularly to an inward flange 15" of the plate. The side plate 14" is connected at a hinge 26" to a mounting plate 27" that is mounted to the side S of the vehicle. The hinge 26" permits the full range of pivoting of the air turning component and side plate from the deployed position of FIG. 12 to the stowed position of FIG. 13. The hinge 26" may thus be constructed like the hinges described above.

The mounting plate 27" includes an outwardly projecting flange 28" against which the side plate 14" bears when the device is deployed, as shown in FIGS. 11-12. This flange thus maintains the side plate at a predetermined angle relative to the side S of the vehicle to impart the angle β described above (see FIG. 7). The device 10" incorporates a retraction element 40" that serves as the mounting component connected between the extrusion 16" and the door D. The retraction element includes a lanyard or tether 41" that is generally non-extensible, unlike the strap 41 described above. The lanyard if fastened at end 46" to the door D and at the opposite end 42" to the extrusion 16", such as by way of a machine screw or other similar fastener. As shown in FIG. 13 the lanyard flexes or folds when the device 10" is in its stowed position. As with the other embodiments the device 10" and particularly the extrusion 16" is configured so that only a minimal gap exists between the door D and side S of the vehicle.

Figure 15:
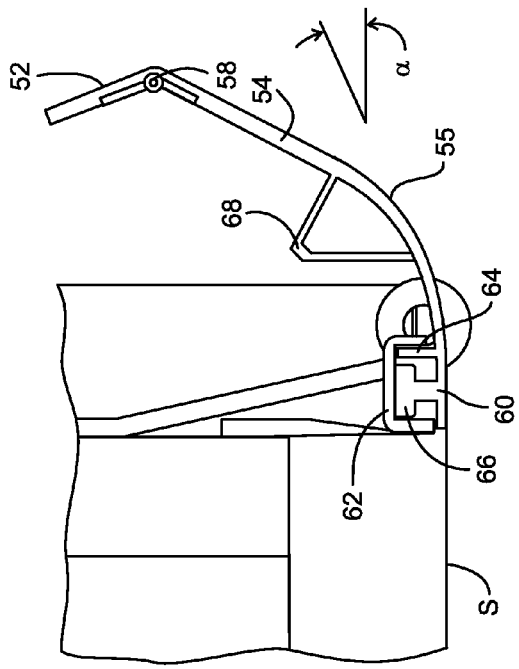
FIG. 15 is a top view of the device shown in FIG. 14.
Figure 14:
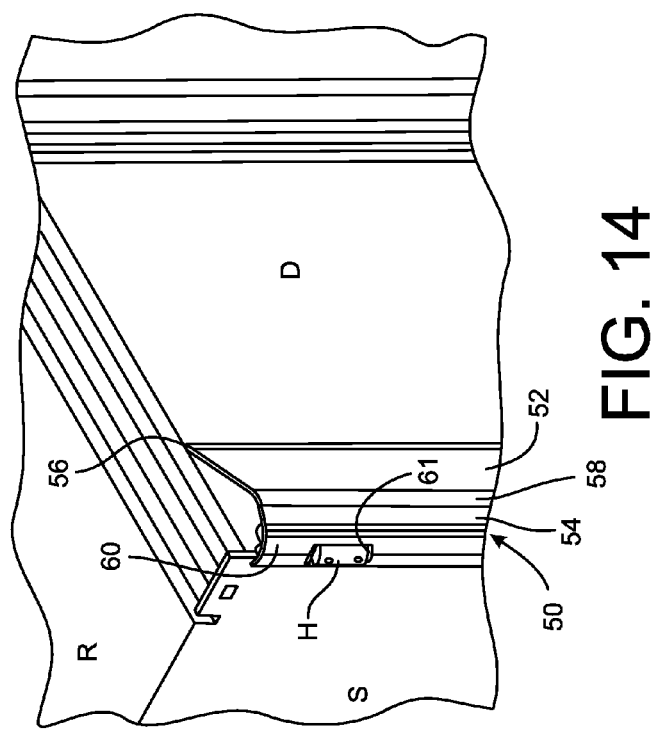
FIG. 14 is a top perspective view of a drag reduction device according to a further embodiment, shown with the device in its deployed position.
Figure 16:
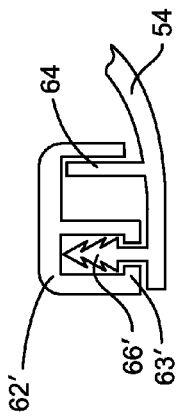
FIG. 16 is an enlarged top view of an attachment element for use with the device shown in FIG. 15.

In the embodiments of FIGS. 1-13, the devices 10, 10' are continuously attached to both the rear door and side wall of the truck/trailer. In an alternative embodiment the leading end of the device may be disengageable from the trailer. Thus, as shown in FIGS. 14-16, a device 50 may include a rear plate 52 that is attached to the rear door D by a hinge 56, in the same manner as described above for rear plate 12 described above. The device 50 includes an air turning component 54 that is connected by a hinge 58 to the rear plate 52 at its trailing edge. The component 54 is configured to produce the air turning effects described above and may have the same general configuration as the turning components 16, 16'. The component 54 may thus be configured so that the outer surface 55 follows a radius of greater than about 3.0 in. to turn the air flow at the angle α of greater than 15°.

The leading edge of the air turning component 54 includes mounting component in the form of a side plate having an attachment element 60 that removably engages a socket 62 mounted to the hinge frame of the rear door. The attachment element 60 may include cut-outs 61 aligned with the hinges H of the rear door D to allow the attachment element to sit as flush to the side wall S of the trailer as possible. In one embodiment, the attachment element may include a magnet 66 that magnetically adheres the attachment element 60 to the socket 62. A flange 64 may be provided to engage the socket 62 to hold the device 50 against accidental disengagement. In an alternative embodiment, the magnet 66 may be replaced with a push-in type barbed fastener 66', as shown in FIG. 16. The socket 62' may be configured so that the opening 63' engages the barbs of the fastener 66' to prevent its inadvertent dislodgment.

It is understood that a plurality of attachment element and socket combinations are provided along the length of air turning component 54. The magnets 66 may be permanent magnets that are sufficiently strong to hold the leading edge of the component 54 against the side wall S under the typical maximum air speed passing along the side the vehicle. However, the magnetic engagement between the sockets and magnets must not be too strong that the device cannot be manually disengaged from the trailer.

In this embodiment, the device 50 requires intervention to disengage the attachment element 60 from the socket 62. The device may incorporate an internal frame 68, similar to the frame 16a of FIG. 5, which helps maintain the integrity of the air turning component as it is grasped by the vehicle operator to disengage all of the attachment elements 60 from all of the sockets 62. As with the prior embodiments, the hinge 56 allows the rear plate 52 to pivot so that it rests against the rear door D when the door is fully opened. The hinge 58 between the component 54 and rear plate 52 allows the component to pivot inward toward the rear plate when the device 50 is in its stowed position. The hinge 58 may be spring biased so that the component 54 automatically pivots inward when the device 50 is disengaged from the socket 62. It is contemplated that this embodiment may be used with a vehicle having a single door, rather than the two side-swing doors in the illustrated embodiment.

Another automatically deployed embodiment is depicted in FIGS. 17-19. In this embodiment, the drag reducing device 70 includes a rear component 72 mounting component that is fastened to the rear door by a hinge 80, in a manner similar to the prior embodiments. A front plate 74 mounting component is similarly attached to the side wall of the trailer by a hinge 86. An air turning component 76 is connected between the rear component 72, by a hinge 82, and the front plate 76, via a hinge 84. The drag reducing device 70 may incorporate an interlocking hinge arrangement or keder for both hinges 82 and 84. As shown in FIG. 17, the component 76 is configured to turn the air flow at an angle α of greater than 15° in a manner similar to the above-described embodiments.

In this embodiment, the rear component 72 is not a rigid plate, as in the prior embodiments, but a flexible plate. In the deployed position, the flexible rear component 72 bows outward away from the rear door, as shown in FIG. 17. When the rear door D is pivoted to its open position, the rear component 72 forms a slight bend 87 at the hinge 80, as illustrated in FIG. 18. The hinge 80 between the rear component 72 and the air turning component 76 allows the rear component to bow slightly at the interface to the air turning component. As the door continues to pivot forward, the flexible rear component 72 forms a bowed portion 88 adjacent the air turning component 76. The two bowed portions 87 and 88 allow the flexible component to assume a thin profile when the rear door D is fully opened, as depicted in FIG. 19.

As with the device 10, the drag reducing device 70 does not require any operator intervention to deploy or stow. The natural stiffness of the rear component 72 holds the air turning component 76 in its proper position. The hinge 86 for the front plate 74 may be spring biased to hold the front plate against the side wall of the trailer to assist in maintaining the air turning component in its proper orientation.

Figure 20:
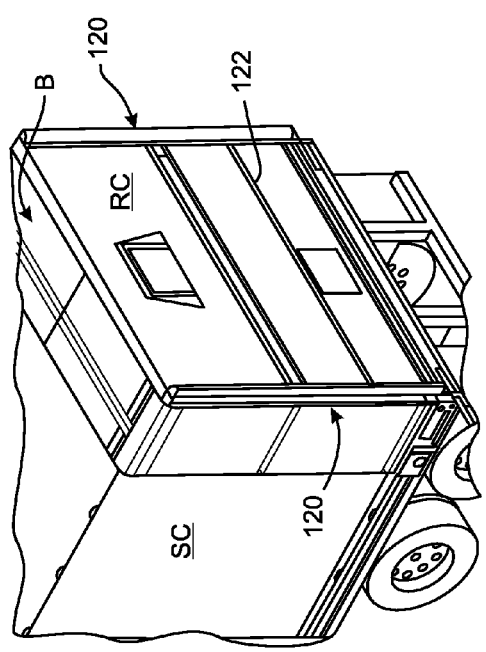
FIG. 20 is a perspective view of the rear of the vehicle or trailer having a sliding cover system with a drag reduction device according to an additional embodiment.
Figure 21:
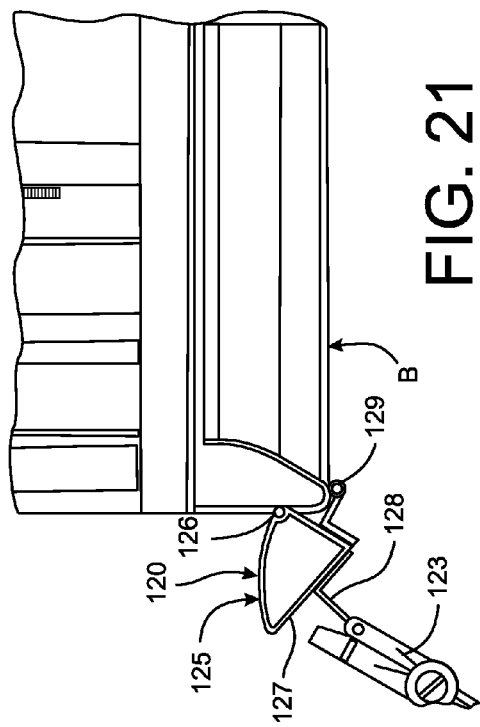
FIG. 21 is a top view of the drag reducing device of FIG. 20 shown in its stowed position.
Figure 22:
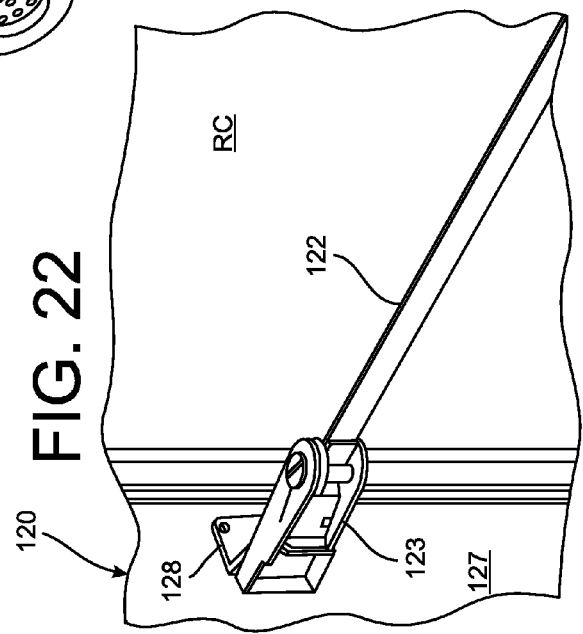
FIG. 22 is an enlarged view of a tension element used with the drag reducing device shown in FIG. 20.

The drag reducing devices disclosed herein may be configured for use on a sliding cover system, such as the CONESTOGA® rolling tarp system manufactured and sold by Aero Industries, Inc. Thus, in one embodiment, a drag reducing device 120 is mounted to the rear frame structure B of a sliding cover system SC, as depicted in FIGS. 20-22. A pair of such devices 120 are mounted to the rear frame structure B on each side of a rear closure RC (which may be a curtain or roll-up door, for instance) and are held in their deployed positions by a tension element 122 spanning the closure. As shown in FIGS. 21-22, the tension element may be a strap that may be tightened by a ratchet element 123 mounted by a bracket 128 to an inner surface 127 of the device 120.

The device 120 may be in the form of a continuous extrusion, as depicted in FIG. 21. The extrusion defines a curved air turning surface 125 that is configured similar to the outer surface 17 of the air turning component 16 described above. In particular, the surface 125 may be configured to provide a smooth curved surface to turn the air flow by an angle of greater than 10° and in a specific embodiment about 30°. The device 120 is mounted to the rear frame structure B by a pivot mount 126 that may take on a variety of forms, such as a piano hinge, a sleeve and pintle, an interlocking rod and channel configuration or a keder. Since there is no outwardly swinging rear door, as in the prior embodiments, there is no special need for the device 120 to pivot fully against the sliding cover SC. Where the rear closure RC is a curtain, the device may incorporate a rear curtain clamp 129 extending from the inner surface 127 and arranged to pinch the rear curtain against the rear frame structure B when the device is in its deployed position. The rear curtain clamp also reacts the tension applied by the tensioning element 122 when the tensioning element is connected to the devices at opposite sides of the rear closure RC.

Figure 25:
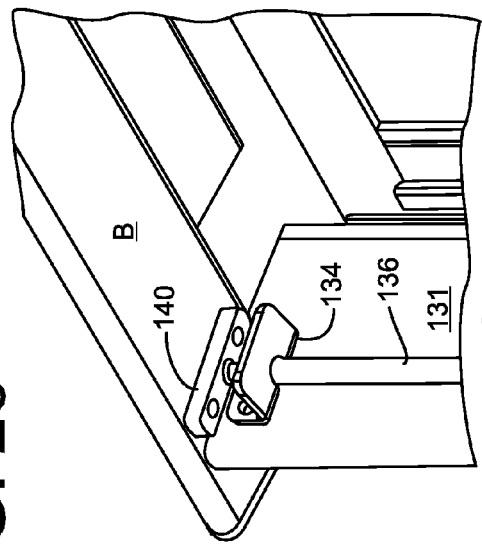
FIG. 25 is a rear perspective view of the upper portion of the locking mechanism illustrated in FIG. 23, shown with the locking mechanism in its unlatched position.
Figure 26:
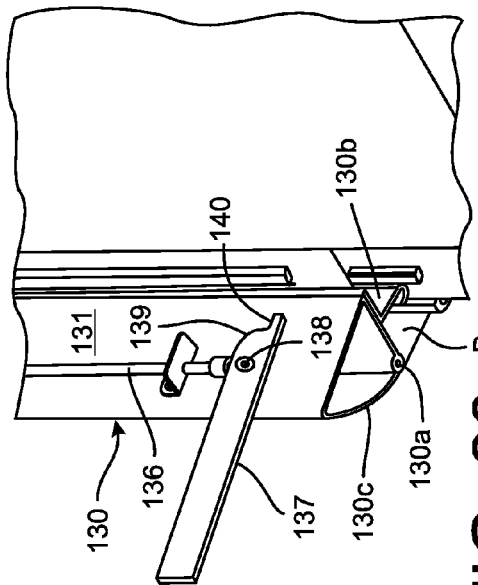
FIG. 26 is a rear perspective of the lower portion of the locking mechanism shown in FIG. 25.
Figure 23:
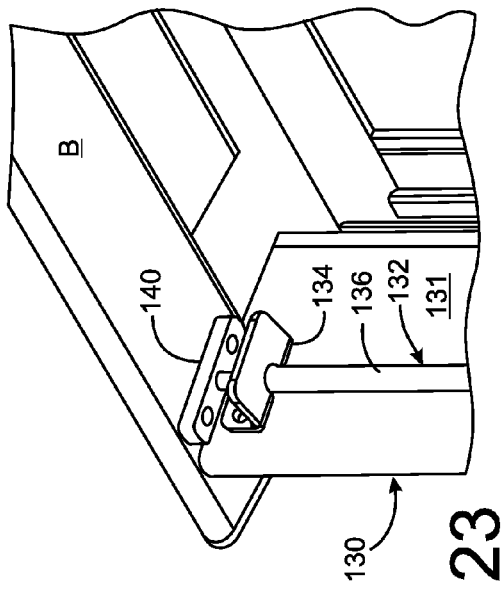
FIG. 23 is a bottom perspective view of a locking mechanism for a drag reducing device of another embodiment, shown with the locking mechanism in its latched position.
Figure 24:
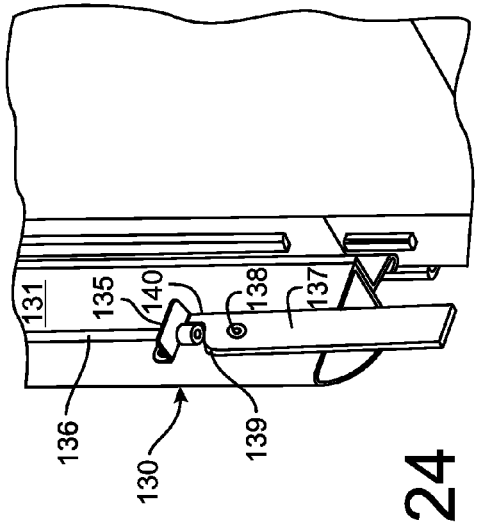
FIG. 24 is a rear perspective view of lower portion of the locking mechanism shown in FIG. 23.

In an alternative embodiment, the tensioning element is replaced by a latch mechanism, such as the mechanism 132 included in the drag reducing device 130 shown in FIGS. 23-26. The drag reducing device 130 may be configured like the device 120 with a pivot mount 130*a* (FIG. 26) to the trailer rear frame structure B, a stiffening bracket 130*b* and an air turning surface 130*c* as described above. The latch mechanism 132 includes a latch rod 136 that is slidably supported by upper and lower brackets 134 and 135, respectively, mounted to the inner surface 131 of the device. The rod 136 is mounted to slide upward into engagement with a latch plate 140 fastened to the rear frame structure B, as shown in FIG. 23, and downward to disengage the latch plate, as shown in FIG. 25.

The latch rod is moved upward by a cam lever 137 that is mounted to the inner surface 131 at a pivot mount 138. The lever includes a cam surface 139 that contacts the latch rod 136 and is configured to move the rod upward upon rotation of the lever from the vertical orientation shown in FIG. 24 to the horizontal orientation shown in FIG. 26. A stop 140 prevents over-rotation of the cam lever 137, holding the lever in its vertical orientation to keep the lever within the envelope of the drag reducing device 130. The cam lever is manually operated to unlatch the device 130 from the rear frame structure B so that the device can be pivoted clear of the rear closure.

Figure 27:
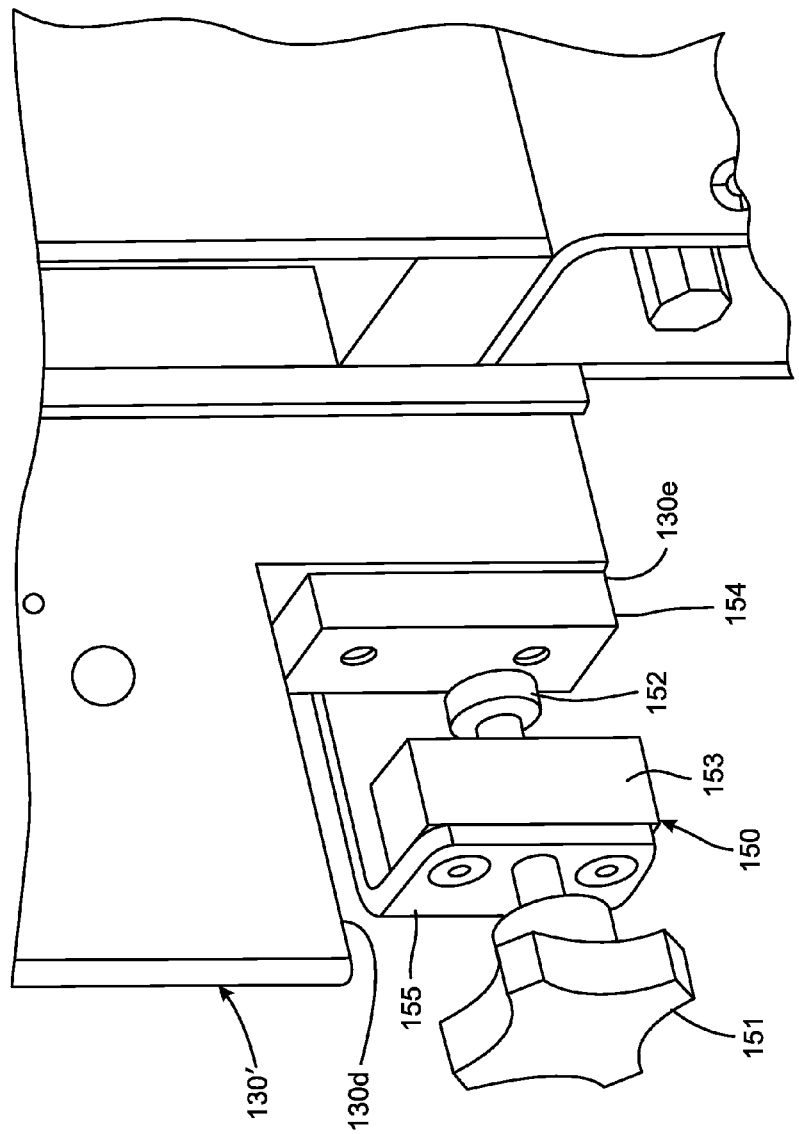
FIG. 27 is a rear perspective view of a locking mechanism according to a further embodiment for use with the sliding cover system of FIG. 20, with the mechanism shown in the locked position and the drag reducing device in its deployed position.
Figure 28:
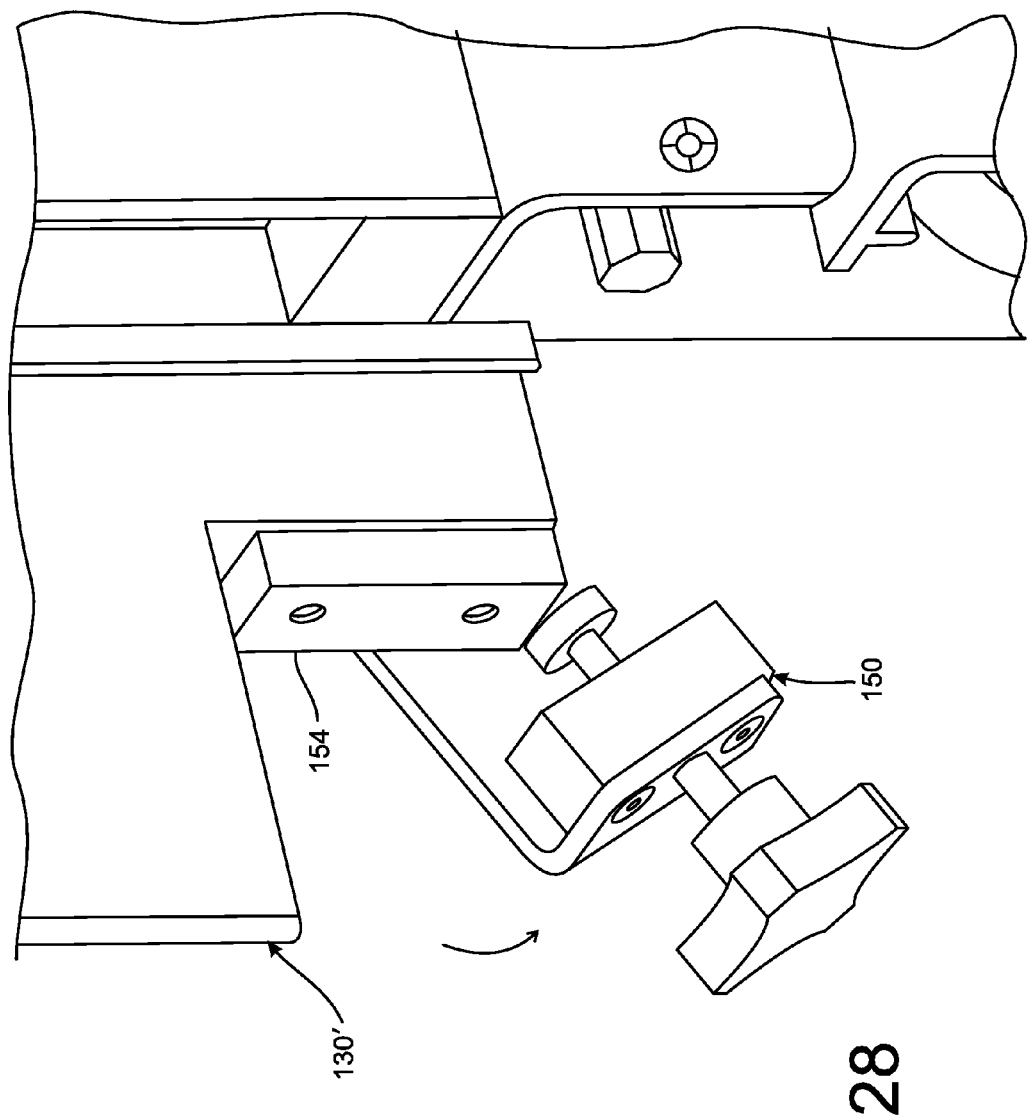
FIG. 28 is a rear perspective view of the locking mechanism shown in FIG. 27, with the mechanism moving from its locked to its unlocked position.
Figure 29:
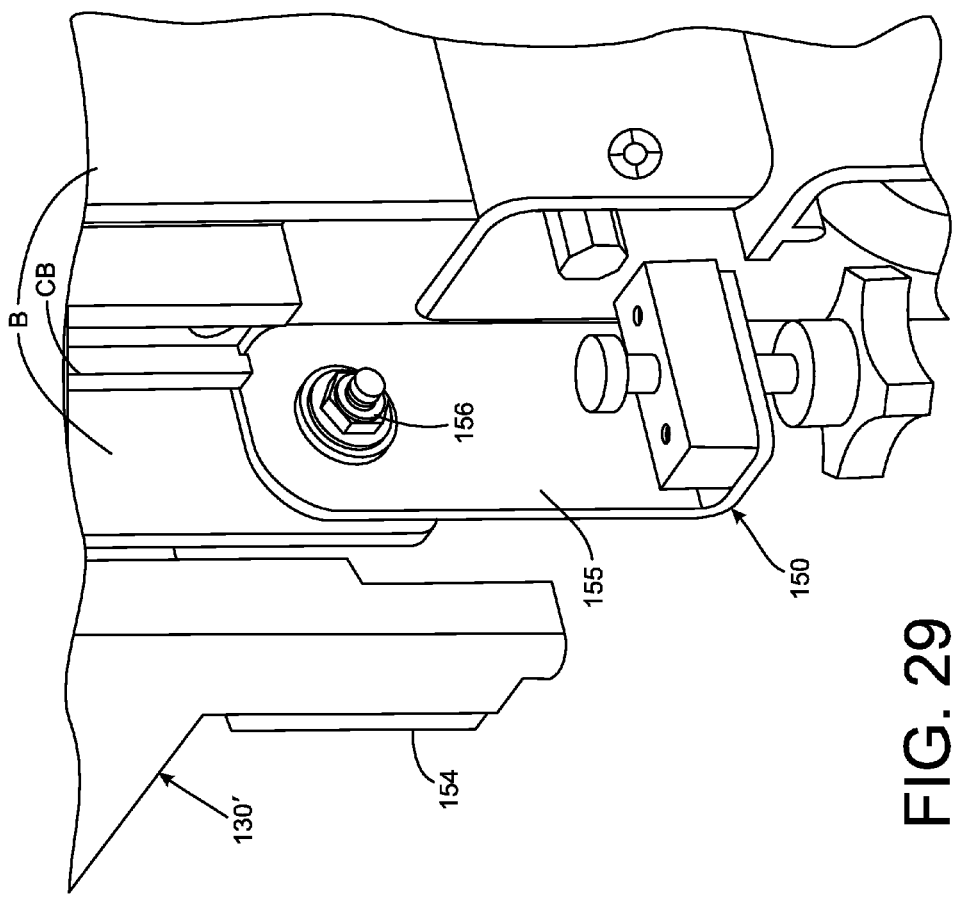
FIG. 29 is a rear perspective view of the locking mechanism shown in FIG. 28, with the mechanism in its unlocked position and the drag reducing device in its stowed position.

FIG. 27 depicts an alternative locking mechanism 150 for use with the side drag reducing device 130', similar to the device shown in FIGS. 21-26. In this embodiment the extrusion forming the device 130' is modified to include a cut-out 130*d* with a back wall 130*e* at the bottom of the device, as shown in FIGS. 27-29. The locking mechanism 150 includes a thumbwheel actuator 151 that is used to move a pressure plate 152 into engagement with a receiver plate 154 fastened to the back wall 130*e* of the device 130', as shown in FIG. 27. The receiver plate 154 may incorporate a recess within which the pressure plate 152 is seated when the pressure plate is clamped onto the receiver plate. The thumbwheel actuator is supported by a mounting block 153 carried by a pivoting bracket 155. The thumbwheel actuator 151 and mounting block 153 are configured so that manual operation of the actuator 151 firmly clamps the pressure plate 152 onto the receiver plate 154. Thus, a threaded interface may be provided in which the thumbwheel actuator is rotated to engage and release the pressure plate 152. Other interfaces are contemplated including a spring-biased interface that biases the pressure plate to the clamped position shown in FIG. 27. In this specific embodiment the thumbwheel actuator would be manually retracted to release the pressure plate from the receiver plate.

The locking mechanism 150 is pivotably mounted to the rear frame structure B so that the mechanism can pivot from the locked position in FIG. 27, to the intermediate position of FIG. 28, to the unlocked position depicted in FIG. 29. In one specific embodiment, the pivoting bracket 155 is attached to the rear frame structure B by a pivot mount 156 that may take on a variety of forms that allow the range of pivoting motion depicted in the figures. It can be appreciated that when the locking mechanism 150 is in its unlocked position of FIG. 29 the drag reducing device 130' may be pivoted outward away to the side of the rear frame structure to allow access to the rear closure RC (FIG. 21).

Figure 30:
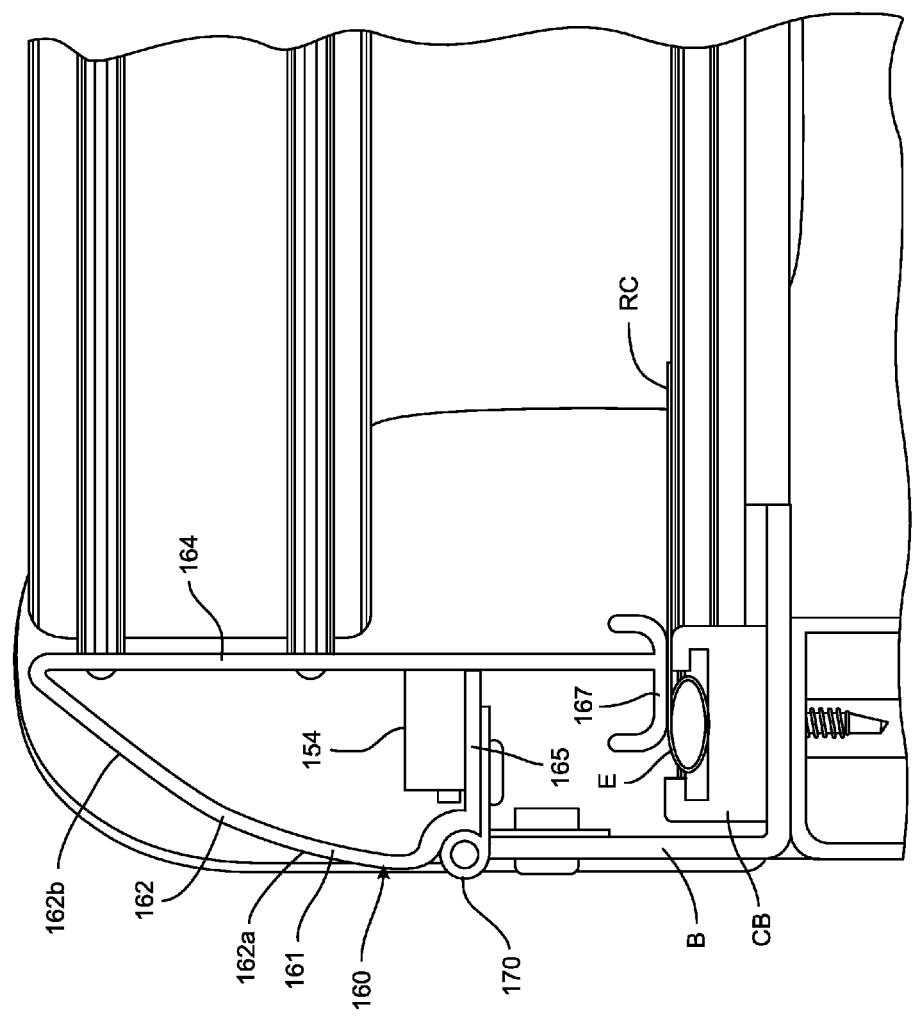
FIG. 30 is a top view of a side drag reducing device for use with a sliding cover system according to a further embodiment, with the device shown in its deployed position.
Figure 31:
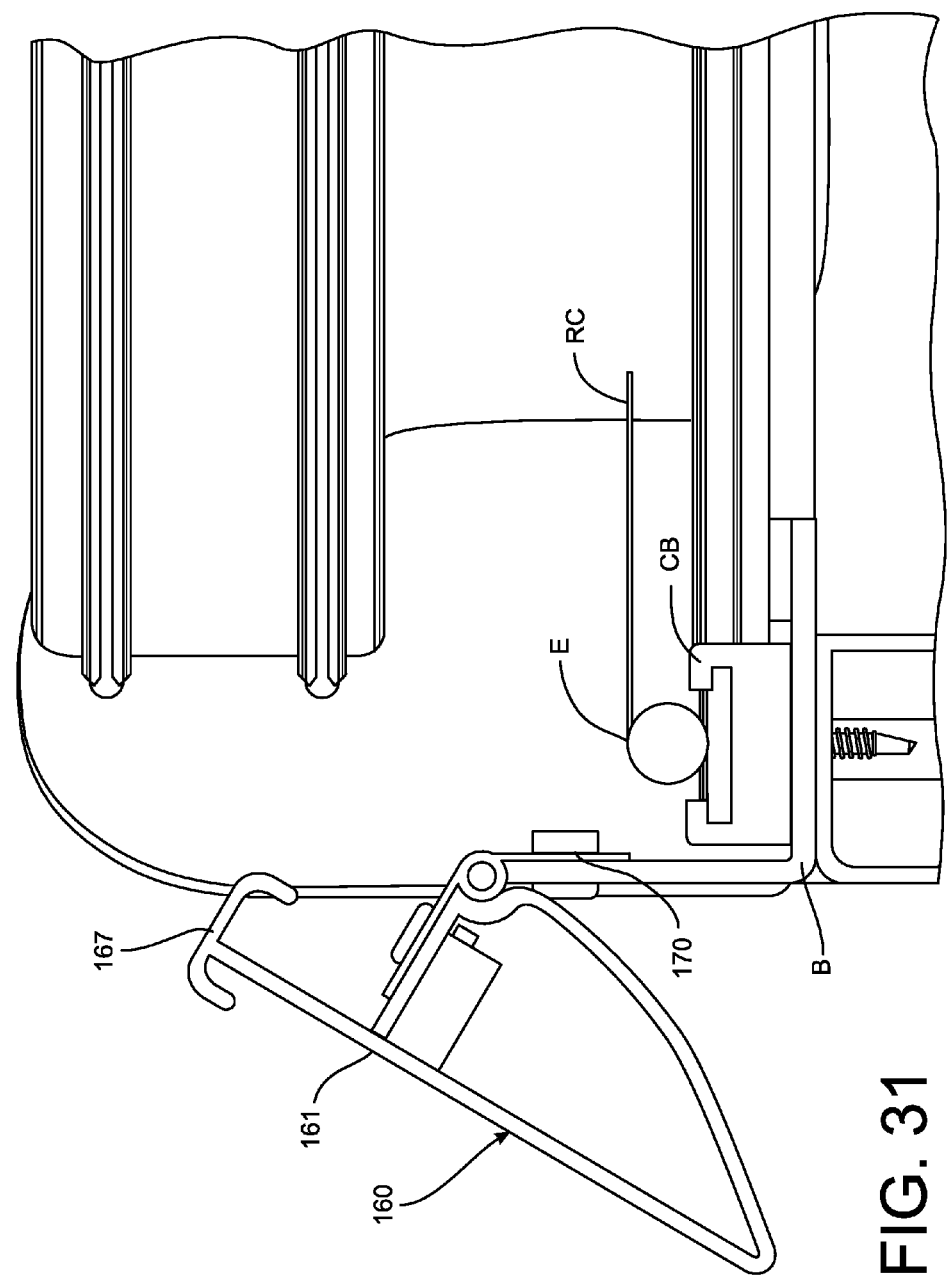
FIG. 31 is a top view of the side drag reducing device of FIG. 30 with the device shown in its stowed position.

A side drag reducing device 160 is shown in FIGS. 30-31 for use with a sliding cover system, such as the system discussed above. The device includes an extruded body 161 having a curved outer surface 162 that includes a portion 162*a* that is curved to produce the air turning feature described herein. The outer surface may further incorporate a generally linear portion 162*b* as also discussed above. The extrusion is fastened to the rear frame structure B of the sliding cover system by way of a hinge 170. The hinge 170 is configured so that the device 160 may pivot from the deployed position shown in FIG. 30 to the stowed position shown in FIG. 31. The extruded body 161 may further include an inner wall 164 and a rear wall 165. The rear wall may support a receiver plate 154 to incorporate the locking mechanism 150 described above.

In one feature of the device 160, the inner wall 164 projects toward a curtain clamping base CB of the cover system in which the rear closure RC is a curtain. As shown in FIG. 31, the rear curtain includes a side bead E on each side of the curtain that is aligned with the clamping base CB. The side bead adds some rigidity to the rear curtain and facilitates closing the curtain. For instance, in certain flexible cover systems, such as the CONESTOGA® cover system manufactured by Aero Industries, Inc., the side bead E is engaged by a rear curtain hinged clamp that may be mounted to the hinge 170. The hinged clamp compresses the side bead E into the clamping base to engage and seal the rear curtain to the rear frame structure B. In accordance with the present embodiment of the side drag reducing device 160, the inner wall 164 terminates in an end plate 167 that extends the length of the extruded body 161, which in turn extends for substantially the entire length of the rear curtain. The inner wall 167 acts as a rear curtain clamp to compress the side bead E into the clamping base CB as shown in FIG. 30. With this feature the drag reducing device 160 can replace the curtain hinged clamp with no modification to the rear frame structure.

The air turning aspect can also be implemented at the top rear edge of the trailer, or more particularly generally contiguous with the rear edge of the roof of the vehicle/trailer. As depicted in FIG. 1, an upper drag reducing device 200 may be provided that can be deployed and stowed without interfering with the ability to fully open the rear doors. A pair of devices may be mounted to the rear doors D, leaving a gap G as needed to accommodate rear lights of the trailer or vehicle. The device 200 may be include an extrusion 201, as shown in FIGS. 32-34, that extends along half the width of the trailer T (when two separate devices are used), or that extends across the entire width of the trailer (when a single device is used). The extrusion 201 includes a leading surface 202 and a trailing surface 204, in which the leading surface may be curved in the same manner as the side-mounted device, such as device 10 discussed above. Thus the curvature of the leading surface is configured to turn the airflow through an angle of at least 10° and in a specific embodiment by about 30°. The trailing surface 204 may emulate the surface 162 of the side mounted device shown in FIG. 30 to reduce turbulence as the airflow leaves the leading surface 202. A downward flange 206 may project from the front edge of the leading surface 202. The flange may be configured to abut the rear of the roof R of the trailer, or may be configured to seat within a channel or trough in the roof. Engagement between the flange 206 and the roof of the vehicle maintains the leading surface generally contiguous with the roof and ensures a smooth airflow transition from the roof to the drag reducing device 200.

The extrusion 201 includes a bottom wall 210 that is hingedly connected to the vehicle door D. A stiffening rib 208 may be provided between the bottom wall and upper surface. The rib further defines a generally enclosed compartment 209 that can may house various components, such as a plasma actuator operable to generate a plasma airflow across the upper drag reducing device 200. In one embodiment a hinge 212 is provided that allows the extrusion 201 to pivot forward relative to the door D when the door is opened and the device is in its stowed position shown in FIGS. 33-34. The hinge may be configured to limit the rearward movement of the device 200 away from the door so that the flange 206 always abuts the trailer when in the deployed position. When the rear door D is opened, the trailing surface 204 contacts the side wall S of the trailer, which caused the extrusion 201 to pivot about the hinge 212 over the top edge of the door, as shown in FIG. 33. This feature allows the top drag reducing device 200 to pivot clear of the space between the door D and trailer side S so that the door can be fully opened, as best shown in FIG. 31.

A retraction element 220 may be provided that restores the drag reducing device 200 to its operative position when the door D is moved from the open position of FIGS. 33-34 to the closed position shown in FIG. 29. In one embodiment the retraction element may be similar to the retraction element 40 shown in FIG. 8, in particular including an elastic band 221, connected by hooks 223, 225 to the vehicle door D and extrusion 201, respectively.

In certain embodiments the device 200 may be configured to extend across the entire width of both rear doors D, rather than including the gap G shown in FIG. 1. It can be appreciated that the gap G corresponds to the location of the upper rear lights for the trailer. In embodiments where the device extends uninterrupted across the width of the trailer the extrusion 201 may be formed of a generally transparent material so that the vehicle lights are visible through the extrusion. Thus, the extrusion may be formed of a polycarbonate resin thermoplastic, or other transparent and durable plastic or polymer material. In other embodiments the length and angle of the trailing surface 204 may be modified so that it does not visually interfere with the rear trailer lights.

Figure 35:
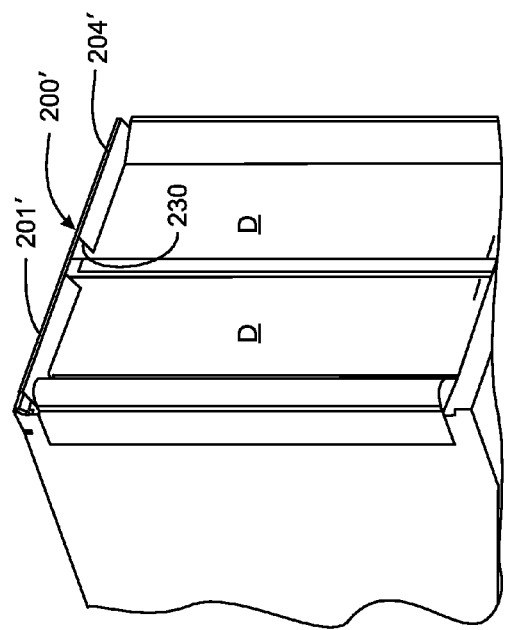
FIG. 35 is a bottom perspective view of a top drag reducing device according to another embodiment.

Alternatively, the extrusion 201' of the device 200' may be modified to include a notch 230 formed in the trailing surface 204', as shown in FIG. 35. The notch is aligned with the lights on the rear of the trailer or on the rear doors D so that the light are visible when the device 200' is deployed. The notch need only be defined in the underside of the extrusion 201' since the lights will be viewed from below the level of the device 200' mounted on the truck/trailer.

Figure 36:
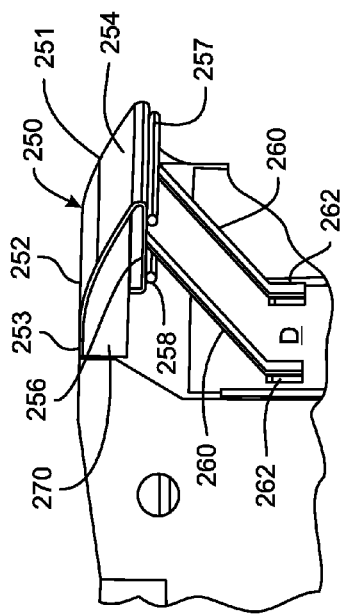
FIG. 36 is a rear perspective view of a top drag reducing device according to a further embodiment shown in its deployed position.
Figure 37:
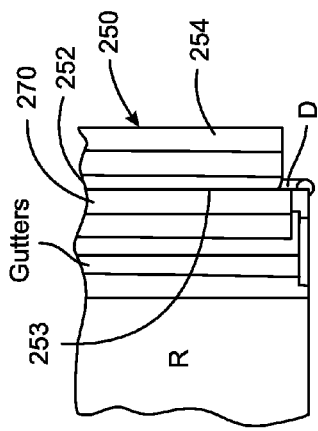
FIG. 37 is a top view of the top drag reducing device shown in FIG. 36.
Figure 38:
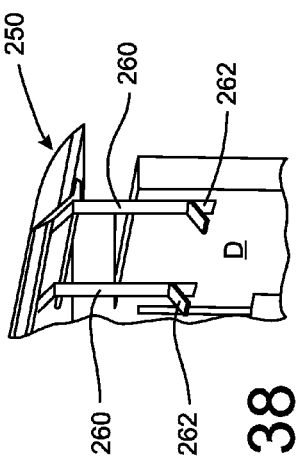
FIG. 38 is a perspective view of the top drag reducing device shown in FIG. 36 with the device in its stowed position.

A top drag reducing device 250 is shown in FIGS. 36-38 that is supported on the rear door D by angled struts 260. The device 250 includes an air flow turning component 251 in the form of an extrusion that forms a leading surface 252 and a trailing surface 254. The leading and trailing surfaces can be configured like the leading and trailing surfaces described above to turn the air flow in the manner also described above. The leading edge 253 is configured to abut the rear of the trailer to provide a smooth air flow transition from the over the roof of the trailer to the drag reducing device 250.

The extrusion 251 further includes a support plate 256 that may include a pair of C-shaped channels 257, 258 running along the length of the extrusion. The channels 257, 258 may be configured to receive a sliding fastener, such as a fastener for attaching the angled struts 260 to the extrusion. In another embodiment the angled struts are attached directly to the support plate 256, such as by welding or a mechanical fastener. The angled struts are mounted to the rear door D by a corresponding pair of hinges 262. The hinges are configured to be closed when the device 250 is in its deployed position, as shown in FIG. 36. The hinges are opened when the door is opened, as shown in FIG. 38, so the device 250 can pivot over the top of the door so as not to impede movement of the door to the fully opened position. The hinges are preferably spring biased to bias the struts to the deployed position of FIG. 36 in order to maintain the leading edge 253 in tight contact with the rear of the trailer.

The leading edge 253 of the leading surface 252 may abut a generally planar gutter foil 270 (FIGS. 36-37) that is mounted to the rear of the roof R of the trailer. The gutter foil 270 is configured to sit over one or more rear gutters of the trailer, extending forward from the rear to span a desired number of gutters. The gutter foil reduces the airflow turbulence produced as the air passes over the disruptions in the roof surface created by the gutters. Since the gutters do not span the entire width of the trailer, as seen in FIG. 37, the function of the gutters is not impaired. Moreover, the gutters may be perforated to permit water flow into the gutters. In certain embodiments the leading surface 252 of the device may be modified to incorporate the gutter foil. In this modification, the leading surface would extend forward over gutters when the device is deployed.

Figure 39:
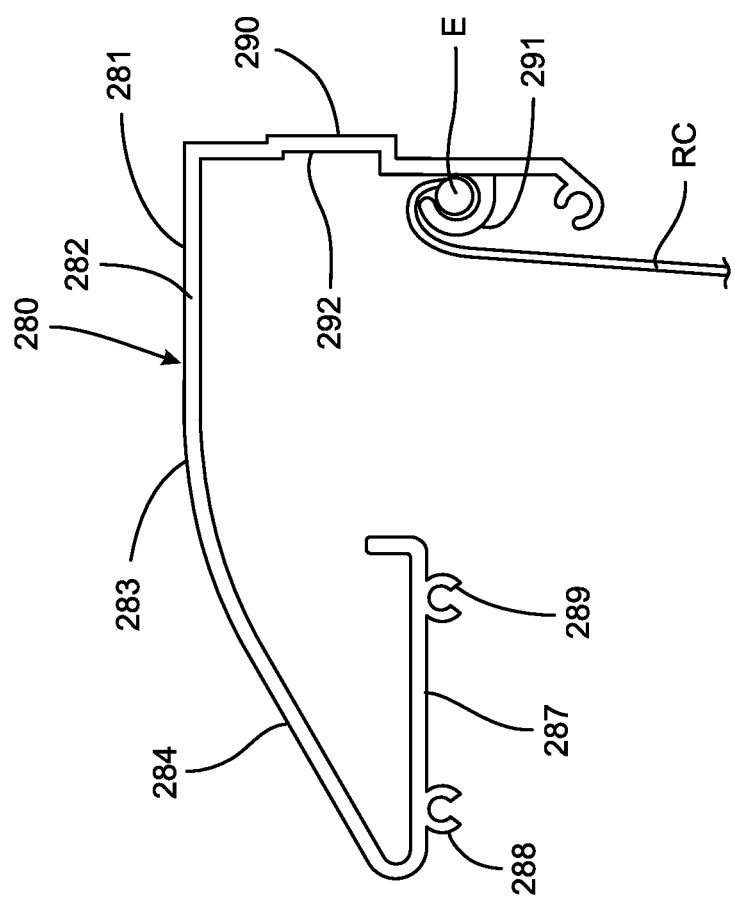
FIG. 39 is a side view of an extrusion for a top drag reducing device according to yet another embodiment.

A modified extrusion 280 for a top drag reducing device is shown in FIG. 39 which is configured for use alternatively in a panel trailer configuration, like the device 250, or with a sliding cover system. The extrusion includes a leading surface 281, a turning surface 283 and a trailing surface 284. The turning and trailing surface may be configured as described above to turn the air flow and prevent turbulence. The leading surface 281 may include a generally planar portion 282 provided to extend the airflow turning effect farther to the rear of the vehicle so that the leading surface can help collimate the airflow exiting the roof of the trailer or sliding cover system. The leading surface 281 may thus act as the gutter foil 270 discussed above.

The extrusion includes a support plate 287 with a pair of C-shaped channels 288, 289 for mounting components or support struts thereto. The extrusion further includes a rear panel 290 that may be configured to abut the rear of the trailer or rear frame structure. The rear panel may include a C-shaped channel 291 that is configured to receive a bead E of a rear curtain closure RC. The rear panel 290 may further include a recess 292 for mounting the device directly to the upper portion of a rear frame structure. When the device 280 is used with a sliding cover system, the extrusion is fastened to the rear frame structure B via the recess 292 using conventional fasteners. A rear curtain closure RC may be carried by the device by mounting the top bead E within the channel 291. In this instance the C-shaped channels 288, 289 are not used.

Figure 40:
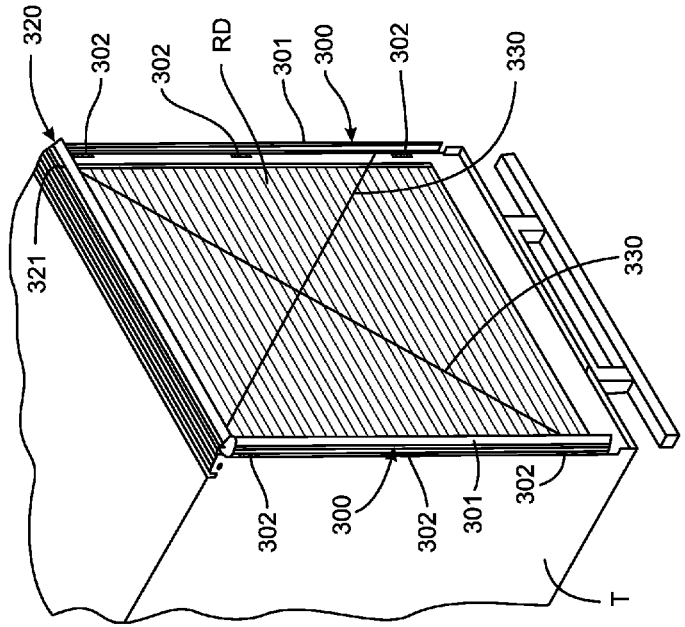
FIG. 40 is a rear perspective view of top and side drag reducing devices mounted on a vehicle having a roll-up rear door.
Figure 41:
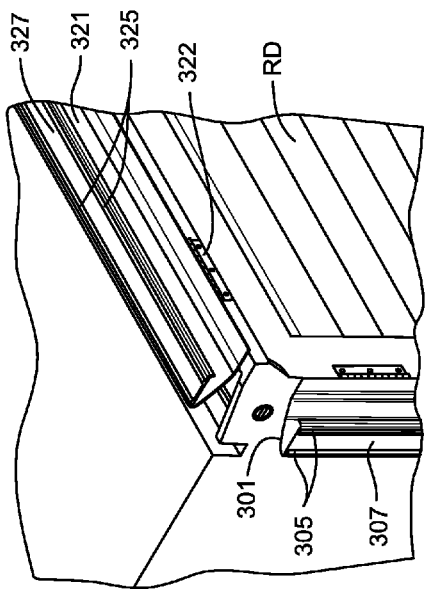
FIG. 41 is an enlarged view of the drag reducing devices illustrated in FIG. 40, shown with the devices in their stowed positions.
Figure 42:
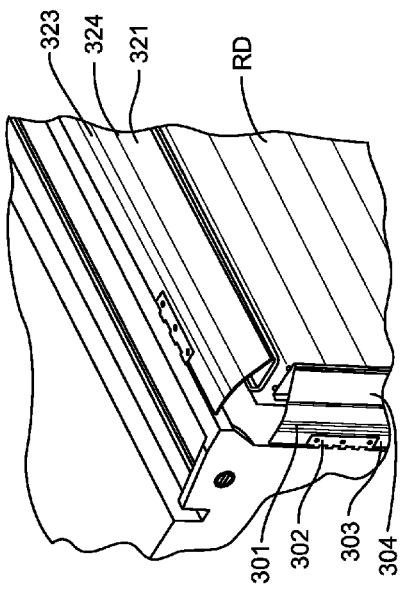
FIG. 42 is an enlarged perspective view of the drag reducing devices illustrated in FIG. 40, shown with the devices in their deployed positions.

Some vehicles/trailers utilize a roll-up rear door, such as the trailer T and rear door RD depicted in FIG. 40. In one embodiment, side drag reducing devices 300 and a top drag reducing device 320 are mounted to the rear frame of the vehicle. As best seen in FIGS. 41-42, the devices 300, 320 are modified from the device 280 shown in FIG. 39. In particular, the devices 300, 320 do not include the planar portion 282 or the rear panel 290. On the other hand, the devices 300, 320 do include a turning surface 303, 323, and a trailing surface 304, 324, as well as the channels 305, 325 projecting from a support plate 307, 327. The devices are mounted by hinges 302, 322 to the respective sides and top of the rear frame supporting the roll-up rear door RD. The hinges may be spring-biased to bias the respective drag reducing device to either the deployed or stowed position. In one embodiment, the hinges 302, 322 are spring biased to bias the devices to the stowed positions depicted in FIG. 41.

In one aspect, the drag reducing devices are held in their deployed position shown in FIG. 42 by cables or cords 330. In one specific embodiment the cables 330 are bungee cords or other elastic cable to provide a restraining force sufficient to hold the drag reducing devices in their deployed position in spite of road shock and vibrations. As depicted in FIG. 40, the cables 300 are mounted cross-wise between the top drag reducing device 320 and each side drag reducing device 300. The cables may be specifically mounted within the channels 305, 325 of the devices using appropriate fasteners. In an alternative approach, a set of cables may be connected between the top drag reducing device 320 and the base of the rear frame of the vehicle and another set of cables can be connected directly between the two side drag reducing devices (similar to the strap 122 shown in FIG. 20)

In each of the top drag reducing devices described above it can be appreciated that the devices provide drag reduction features without projecting appreciably above the roof R of the vehicle/trailer. Vehicles of this type are subject to height restrictions. In many cases, the vehicle/trailer is manufactured to maximize the enclosed volume to thereby maximize the amount of load that can be transported. Thus, vehicle/trailer manufacturers make the vehicles/trailers as tall as possible, or more specifically as close to the legal height limits as possible. Since the height restrictions apply to anything mounted to the vehicle/trailer, most prior top drag reducing devices mounted to the roof R cause the vehicle to exceed the height limits. The top drag reducing devices 200, 250, 280 and 320 disclosed herein are essentially flush with the surface of the roof R and in some cases, lower than the gutter structure of some vehicles/trailers.

In all the embodiments the drag reducing device includes a contoured or curved surface that is configured to turn the airflow passing the rear of the trailer or vehicle. In preferred embodiments the surface turns the airflow at least 10°, and in a specific embodiment about 30°, as the air flows past the drag reducing devices. This modified airflow reduces turbulence at the rear of the vehicle and thus reduces drag. It is further contemplated that the trailing end of the air flow turning components may incorporate a generally straight section followed by an additional curved section to turn the air flow further toward the rear of the vehicle. The additional curved section may be calibrated in conjunction with the first curved section to turn the air flow to optimize the drag reduction performance of the device. The drag reducing devices disclosed herein may incorporate an extruded air turning component that can also be used to house additional drag reducing components, such as plasma actuators. For these modified devices the curved surface may be defined at a different radius than discussed above. In particular, the addition of certain plasma actuators can achieve the desired airflow turning angle with a curved surface having a radius less than 3.0 inches, and in a specific embodiment a radius of 2.0 inches.

In each of the embodiments an extrusion is provided as the air turning component. The extrusion allows tailoring the device to the size of the particular truck/trailer. Thus, the side drag reducing devices may be cut to match the height of a particular vehicle, while the top drag reducing devices may be cut to the width of the vehicle. In many cases it is desirable for the drag reducing devices to be as long as the vehicle permits in order to maximize the drag reducing performance.

What is claimed is:

1. A drag reducing device for a vehicle, the vehicle having opposite side walls, a rear perimeter with a rear opening and at least one door at the opening, said device comprising:
an air flow turning component, associated with each of the vehicle side walls, having a rigid curved surface configured to turn air flow passing over said curved surface when in a deployed position;
a first mounting component for connecting the air flow turning component to one of the at least one door, said first mounting component including a rear plate hingedly attached at one side thereof to said air flow turning component and hingedly attached at an opposite side thereof to the door; and
a second mounting component for connecting the air flow turning component to a corresponding one of the opposite side walls, said second mounting component including a side plate hingedly attached at one side thereof to said air flow turning component and hingedly attached at an opposite side thereof to the vehicle side wall,
wherein said first and second mounting components are configured to support said air flow turning component extending rearward from the vehicle side walls in said deployed position, and
wherein said rear and side plates are hingedly attached to said air turning component and to the door and side wall, respectively, by corresponding hinges, said hinges configured so that said air turning component can move from said deployed position aligned with the side wall of the vehicle to a stowed position between the door and the side wall when the door is fully opened.

2. The drag reducing device of claim 1, wherein said curved surface is defined at a curvature configured to turn the air flow passing the vehicle side wall toward the rear of the vehicle by at least 10°.

3. The drag reducing device of claim 2, wherein said air turning component further includes a trailing surface integral with a rear portion of said curved surface, said trailing surface being generally planar.

4. The drag reducing device of claim 1, wherein said curved surface is defined at a radius of at least 2.0 inches.

5. The drag reducing device of claim 4, wherein said curved surface is defined at a radius of between 3.0 and 6.0 inches.

6. The drag reducing device of claim 5, wherein said curved surface is defined at a radius of about 4.0 inches.

7. The drag reducing device of claim 1, wherein said air turning component is an elongated extrusion having a length so that the opposite ends of the extrusion are adjacent the top and bottom of the door of the vehicle.

8. The drag reducing device of claim 1, wherein the hinge between said side plate and the vehicle side wall is configured to allow the side plate to pivot about 180°.

9. The drag reducing device of claim 1, wherein the hinge between said side plate and said air turning component is arranged between the vehicle side wall and said side plate to offset said side plate away from the vehicle side wall at an angle relative thereto when said device is in said deployed position.

10. The drag reducing device of claim 9, wherein said hinge between said side plate and said air turning component includes a rib projecting from said side plate toward the vehicle side wall in said deployed position and a generally planar flange extending from said air turning component to contact said rib in said deployed position.

11. The drag reducing device of claim 10, wherein said rib is sized so that said rib holds said planar flange against the vehicle side wall in said deployed position.

12. The drag reducing device of claim 9, wherein the hinge between said rear plate and said air turning component is configured so that said rear plate is disposed between said air turning component and the rear door when rear door is fully opened and said air turning component is in said stowed position.

13. The drag reducing device of claim 1, wherein said first mounting component includes at least one elongated elastic strap attached at one end to said air turning component and at an opposite end to the rear door.

14. The drag reducing device of claim 1, wherein said first mounting component includes at least one elongated lanyard attached at one end to said air turning component and at an opposite end to the rear door.

15. The drag reducing device of claim 1, wherein said second mounting component includes an attachment element configured to be removably attached to the vehicle side wall.

16. The drag reducing device of claim 15, wherein said second mounting component includes a side plate extending from said attachment element to said air turning component, said side plate defining cutouts for receiving the hinges of the vehicle rear door.

17. The drag reducing device of claim 15, wherein said second mounting component includes a socket defined in the vehicle side wall and said attachment element is configured for removable engagement within said socket.

18. The drag reducing device of claim 17, wherein said attachment element includes a magnet.

19. The drag reducing device of claim 17, wherein said attachment element includes a barbed fastener configured for push-in engagement within said socket.

20. The drag reducing device of claim 1, wherein said first mounting component includes a flexible plate attached at one side to said air turning component and hingedly attached at an opposite side to the rear door, said flexible plate adapted to at least partially fold onto itself when the rear door is fully opened and said air turning component is in its stowed position.

21. The drag reducing device of claim 1, wherein said air flow turning component includes a hollow frame defined on an interior face of said curved surface.

22. A drag reducing device for a vehicle, the vehicle having opposite side walls, a rear perimeter with a rear opening and at least one door at the opening, said device comprising:
    an air flow turning component, associated with each of the vehicle side walls, having a rigid curved surface configured to turn air flow passing over said curved surface when in a deployed position, said air flow turning component including a hollow frame defined on an interior face of said curved surface;
    a first mounting component for connecting the air flow turning component to one of the at least one door;
    a second mounting component for connecting the air flow turning component to a corresponding one of the opposite side walls; and
    one or more electrical accessories housed within said hollow frame,
    wherein said first and second mounting components are configured to support said air flow turning component extending rearward from the vehicle side walls in said deployed position.

23. The drag reducing device of claim 22, wherein said curved surface is defined at a curvature configured to turn the air flow passing the vehicle side wall toward the rear of the vehicle by at least 10°.

24. The drag reducing device of claim 23, wherein said air turning component further includes a trailing surface integral with a rear portion of said curved surface, said trailing surface being generally planar.

25. The drag reducing device of claim 22, wherein said curved surface is defined at a radius of at least 2.0 inches.

26. The drag reducing device of claim 25, wherein said curved surface is defined at a radius of between 3.0 and 6.0 inches.

27. The drag reducing device of claim 26, wherein said curved surface is defined at a radius of about 4.0 inches.

28. The drag reducing device of claim 22, wherein said air turning component further includes a trailing surface integral with a rear portion of said curved surface, said trailing surface being generally planar.

* * * * *